US010422381B2

(12) United States Patent
Sugita

(10) Patent No.: US 10,422,381 B2
(45) Date of Patent: Sep. 24, 2019

(54) ROLLING BEARING RETAINER, ROLLING BEARING, AND METHOD FOR MANUFACTURING ROLLING BEARING RETAINER

(71) Applicant: NSK LTD., Tokyo (JP)

(72) Inventor: Yoshifumi Sugita, Fujisawa (JP)

(73) Assignee: NSK LTD., Tokyo (JP)

( * ) Notice: Subject to any disclaimer, the term of this patent is extended or adjusted under 35 U.S.C. 154(b) by 3 days.

(21) Appl. No.: 15/548,487

(22) PCT Filed: Feb. 4, 2016

(86) PCT No.: PCT/JP2016/053351
§ 371 (c)(1),
(2) Date: Aug. 3, 2017

(87) PCT Pub. No.: WO2016/125855
PCT Pub. Date: Aug. 11, 2016

(65) Prior Publication Data
US 2018/0172075 A1 Jun. 21, 2018

(30) Foreign Application Priority Data

Feb. 4, 2015 (JP) .................................. 2015-020736
Feb. 4, 2015 (JP) .................................. 2015-020737
(Continued)

(51) Int. Cl.
*F16C 33/38* (2006.01)
*F16C 33/44* (2006.01)
(Continued)

(52) U.S. Cl.
CPC .............. *F16C 33/38* (2013.01); *F16C 19/16* (2013.01); *F16C 33/3806* (2013.01);
(Continued)

(58) Field of Classification Search
CPC .. F16C 33/38; F16C 33/3837; F16C 33/3856; F16C 33/3387
See application file for complete search history.

(56) References Cited

U.S. PATENT DOCUMENTS 4,838,712 A 6/1989 Kubo et al.
6,279,708 B1 8/2001 Yatabe et al.
(Continued)

FOREIGN PATENT DOCUMENTS

CN 2816460 Y 9/2006
DE 102013212962 A1 1/2015
(Continued)

OTHER PUBLICATIONS

Machine Translation for JP 2001-227548.*
(Continued)

*Primary Examiner* — Thomas R Hannon
(74) *Attorney, Agent, or Firm* — Sughrue Mion, PLLC

(57) ABSTRACT

A synthetic resin rolling bearing retainer is to be arranged between an inner ring and an outer ring of a rolling bearing. A plurality of guided portions protruding radially outward from an outer diameter surface of the retainer is provided along a circumferential direction of the outer diameter surface. Each of the guided portions has a guide surface protruding to be in sliding contact with the outer ring, a chamfered portion formed at an edge portion of the guide surface, and a groove portion formed at a portion of the guide surface in an axial direction. The guide surface and the chamfered portion have surface properties where an arithmetic average roughness Ra is 1.0 to 9.8 μm and a maximum height Rt is 10.1 to 102.9 μm. A parting line is provided radially inside the guide surface.

8 Claims, 15 Drawing Sheets

(30) Foreign Application Priority Data

Feb. 2, 2016 (JP) .................................. 2016-017836
Feb. 2, 2016 (JP) .................................. 2016-017837

(51) Int. Cl.
*F16C 19/16* (2006.01)
*B29C 45/26* (2006.01)

(52) U.S. Cl.
CPC ...... *F16C 33/3856* (2013.01); *F16C 33/3887* (2013.01); *F16C 33/44* (2013.01); *B29C 45/2616* (2013.01); *F16C 19/163* (2013.01); *F16C 2208/36* (2013.01); *F16C 2208/52* (2013.01); *F16C 2208/60* (2013.01); *F16C 2208/80* (2013.01); *F16C 2220/04* (2013.01); *F16C 2240/54* (2013.01); *F16C 2322/39* (2013.01)

(56) References Cited

U.S. PATENT DOCUMENTS

| | | | |
|---|---|---|---|
| 6,315,456 B1 * | 11/2001 | Tanimoto | F16C 19/163 29/898.067 |
| 6,742,934 B2 | 6/2004 | Matsuyama et al. | |
| 2002/0097939 A1 | 7/2002 | Matsuyama et al. | |
| 2013/0182987 A1 | 7/2013 | Himeno et al. | |

FOREIGN PATENT DOCUMENTS

| | | |
|---|---|---|
| GB | 2147665 A | 5/1985 |
| JP | 2000-65067 A | 3/2000 |
| JP | 2001-208075 A | 8/2001 |
| JP | 2001-227548 A | 8/2001 |
| JP | 2002-144380 A | 5/2002 |
| JP | 2002-323048 A | 11/2002 |
| JP | 2005-90657 A | 4/2005 |
| JP | 2005-256893 A | 9/2005 |
| JP | 2007198469 A | 8/2007 |
| JP | 2014-5848 A | 1/2014 |
| JP | 2014-95469 A | 5/2014 |

OTHER PUBLICATIONS

Machine Translation for JP 2005-090657.*
Machine Translation for JP 2005-256893.*
Machine Translation for JP 2014-095469.*
International Search Report, issued by International Searching Authority in corresponding International Application No. PCT/JP2016/053351, dated Apr. 12, 2016, (PCT/ISA/210).
Written Opinion, issued by International Searching Authority in corresponding International Application No. PCT/JP2016/053351, dated Apr. 12, 2016, (PCT/ISA/237).
Communication dated Aug. 2, 2018, issued by the State Intellectual Property Office of P.R. China in counterpart Chinese Application No. 201680008792.4.
Communication dated Jan. 30, 2018, from the European Patent Office in counterpart European Application No. 16746686.1.

* cited by examiner

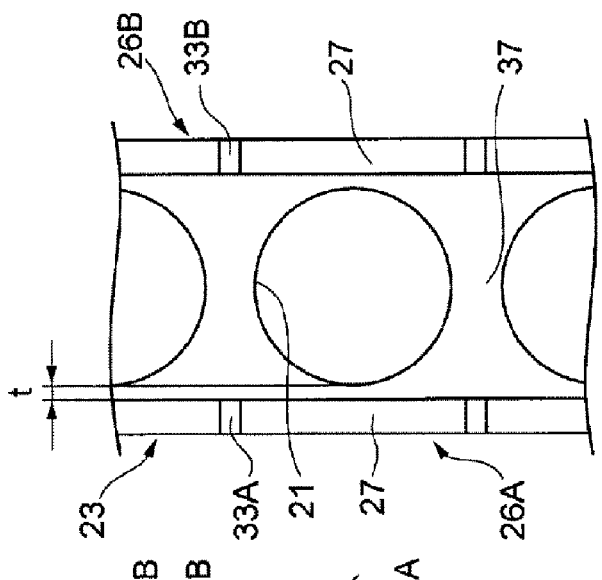
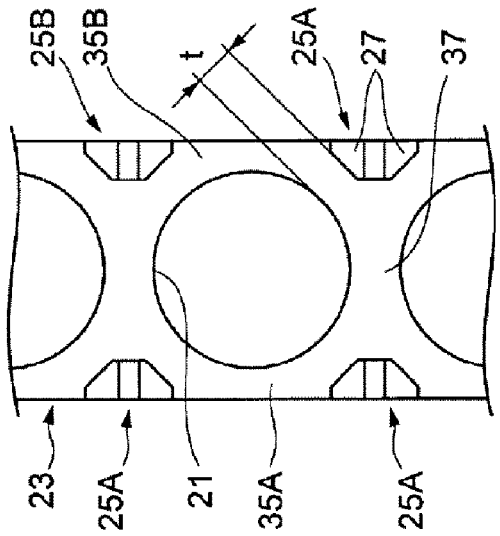
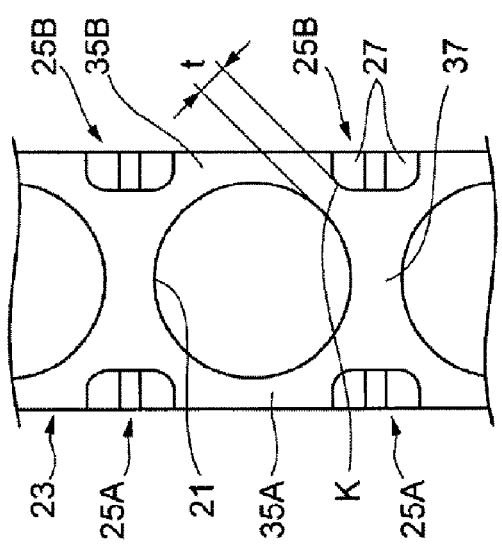

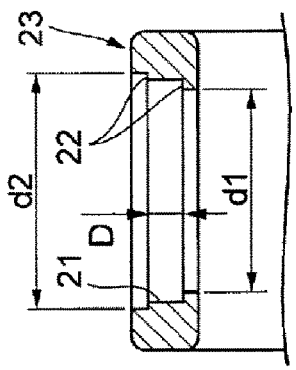
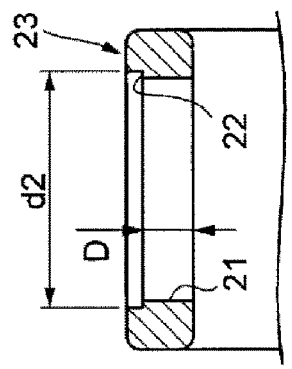
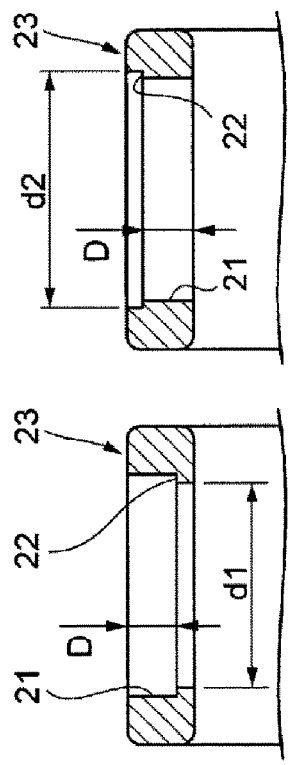
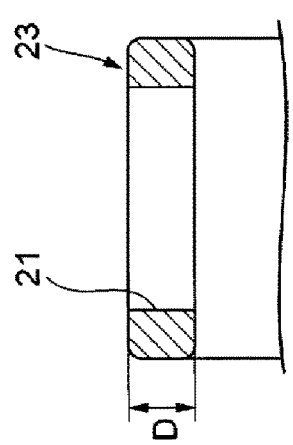
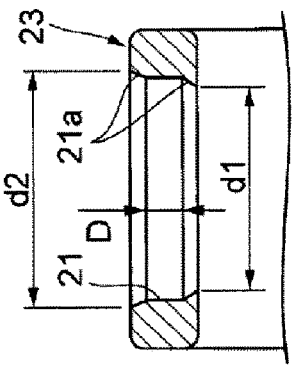
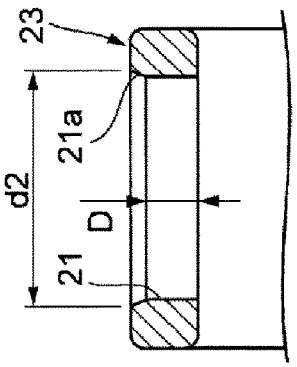
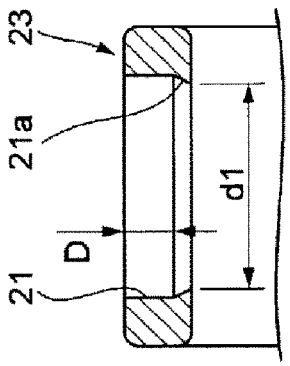
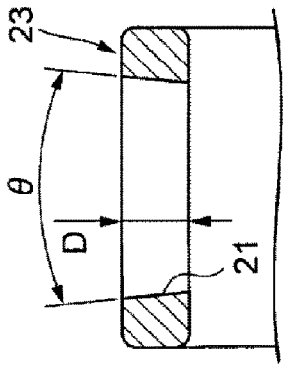

ROLLING BEARING RETAINER, ROLLING BEARING, AND METHOD FOR MANUFACTURING ROLLING BEARING RETAINER

TECHNICAL FIELD

The present invention relates to a rolling bearing retainer, a rolling bearing and a method for manufacturing the rolling bearing retainer.

RELATED ART

Currently, an angular ball bearing and the like have been widely used as a bearing for spindle of a machine tool. In an angular ball bearing for machine tool, a phenol resin retainer is used when using conditions are severe. The phenol resin retainer has a high sliding wear resistance and exhibits excellent durability when it is used in a bearing. However, since the strength of the phenol resin retainer is low and an amount of expansion resulting from water absorption is large, dimension stability thereof is low and a design thereof is limited. In general, the phenol resin retainer cannot be made to have small dimensional tolerance and guide gap, so that a retainer sound is generated and an asynchronous run-out (NRRO: Non-Repeatable Run-Out) is deteriorated. Also, since the phenol resin is a thermosetting resin, it is difficult to make a complex shape having a plurality of pockets. For this reason, after formation, it is necessary to perform cutting processing and the productivity is low, so that the phenol resin is not suitable for the mass production.

In the meantime, a synthetic resin retainer that is to be manufactured by an injection molding has high productivity. However, when the using conditions of the bearing are severe, the lubricating property of a sliding part is lowered and the service life is shortened due to the wear.

As a means for improving the durability of the retainer, Patent Document 1 discloses a technology of forming a retainer surface with a micro concave-convex shape and controlling the surface shape. According to this technology, it is possible to improve the lubricating property and durability of the sliding part by adjusting the micro concave-convex shape.

CITATION LIST

Patent Document

Patent Document 1: Japanese Patent Application Publication No. 2014-95469A
Patent Document 2: Japanese Patent Application Publication No. 2002-144380A

SUMMARY OF THE INVENTION

Problems to be Solved

As representative injection molding methods of the retainer, a radial draw method of radially sliding a moveable die and an axial draw method of axially sliding a moveable die may be exemplified. However, in a general retainer and a shape of a die for forming a retainer, a burr is formed on a molded product surface corresponding to a die matching part of a die member. In the radial draw type, the burr is formed on an outer diameter-side surface of the retainer, and in the axial draw type, the burr is formed at a connection portion with a chamfered portion. When the burr is formed in a guided portion of the retainer (in the case of an outer ring guide retainer, an outer diameter surface of the retainer corresponds to the guided portion), the formed burr may damage a counter member of the sliding. Also, the wear may be progressed on the basis of the formed burr at the retainer-side, too. The formed burr can be removed by barrel processing or the like. However, at this time, a micro concave-convex shape transferred to the retainer is also removed, so that it is not possible to achieve the improvements on the lubricating property and the durability.

Patent Document 2 discloses a technology of providing a concave portion of an outer diameter surface of a retainer with a parting line so as to omit the burr removing processing. However, Patent Document 2 does not consider the retainer to which a specific surface shape is to be transferred. Also, the corresponding technology cannot be applied to a rolling bearing that is used under severe environments, such as a rolling bearing for spindle support of a machine tool. For this reason, the wear resistance of the retainer is not sufficiently ensured, so that the service life of the bearing is shortened. This problem is not always improved even when a resin material having high slidability is used.

Also, any of Patent Documents 1 and 2 does not consider a chamfered portion provided at an edge portion of the guided portion. Usually, the retainer is supported with a gap in the bearing. Therefore, the retainer itself is tilted, so that the chamfered portion may slide relative to the other member such as an outer ring. For this reason, when the burr is formed at the chamfered portion, the retainer is subjected to the wear, as described above, so that the service life of the bearing may be shortened due to wear powders to occur.

Also, the micro concave-convex shape of the retainer surface is obtained by processing a die surface of a molding die into a micro concave-convex shape in advance and transferring the micro concave-convex shape of the die surface to a molded product. However, since a pocket of the retainer is formed by a slide core, the micro concave-convex shape of an inner peripheral surface of the pocket may be cut by shear with the die upon drawing of the slide core.

The present invention has been made in view of the above situations, and a first object thereof is to provide a rolling bearing retainer, a rolling bearing and a method for manufacturing the rolling bearing retainer capable of further improving durability of a retainer having a specific surface shape formed on a surface thereof without reducing productivity.

A second object of the present invention is to provide a rolling bearing retainer having high durability and productivity by suppressing a damage of a micro concave-convex shape of an inner peripheral surface of a pocket of the retainer, a rolling bearing having the rolling bearing retainer and a method for manufacturing the rolling bearing retainer.

Means for Solving Problems

The present invention is configured as follows.

(1) A synthetic resin rolling bearing retainer to be arranged between an inner ring and an outer ring of a rolling bearing,
wherein a plurality of guided portions protruding radially outward from an outer diameter surface of the retainer is provided along a circumferential direction of the outer diameter surface,
wherein each of the guided portions has a guide surface protruding to be in sliding contact with the outer ring, a chamfered portion formed at an edge portion of the guide surface, and a groove portion formed at a portion of the guide surface in an axial direction, wherein the guide surface and the chamfered portion have surface properties where an arithmetic average roughness Ra is 1.0 to 9.8 μm and a maximum height Rt is 10.1 to 102.9 μm, and wherein a parting line is provided radially inside the guide surface.

(2) The rolling bearing retainer of the above (1), wherein the parting line is provided for any one of the groove portion and an end face of the bearing retainer.

(3) The rolling bearing retainer of the above (1) or (2), wherein the chamfered portion has a curved surface that is connected to the edge portion of the guide surface in a tangential direction.

(4) The rolling bearing retainer of the above (1) or (2), wherein the chamfered portion has an inclined surface, which is connected to the edge portion of the guide surface and of which an angle to the guide surface is 20° or less.

(5) The rolling bearing retainer of one of the above (1) to (4), wherein a relief groove concaved radially inward is formed in a region facing a raceway surface edge that is a boundary between an outer ring inner peripheral surface and an outer ring raceway surface of the outer ring.

(6) The rolling bearing retainer of one of the above (1) to (5), wherein a surface layer of the retainer is formed with an amorphous layer that has a thickness of 0.1 to 30 μm from a surface of the retainer and does not include therein a reinforced fiber.

(7) A method for manufacturing the rolling bearing retainer of one of the above (1) to (6) by using a molding die, the method including:

transferring a shape of a processing surface applied to a die surface of the molding die to at least one of the guide surface and the chamfered portion.

(8) A rolling bearing retainer having pockets configured to keep therein a plurality of rolling elements to be freely rollable, which are arranged between an inner ring raceway and an outer ring raceway of a rolling bearing, wherein an inner peripheral surface of each pocket has surface properties where an arithmetic average roughness Ra is 1.0 to 9.8 μm and a maximum height Rt is 10.1 to 102.9 μm, and wherein the inner peripheral surface of each pocket is a cylindrical surface formed along a radial direction of the retainer and a thickness of the cylindrical surface in the radial direction of the retainer is 3.5 mm or less.

(9) A rolling bearing retainer having pockets configured to keep therein a plurality of rolling elements to be freely rollable, which are arranged between an inner ring raceway and an outer ring raceway of a rolling bearing, wherein an inner peripheral surface of each pocket has surface properties where an arithmetic average roughness Ra is 1.0 to 9.8 μm and a maximum height Rt is 10.1 to 102.9 μm and is a tapered surface of which a diameter increases from an inner periphery-side towards an outer periphery-side.

(10) The rolling bearing retainer of the above (8) or (9), wherein a surface layer of the retainer is formed with an amorphous layer that has a thickness of 0.1 to 30 μm from a surface of the retainer and does not include therein a reinforced fiber.

(11) The rolling bearing retainer of one of the above (8) to (10), wherein at least one of a retainer inner diameter-side and a retainer outer diameter-side has a stepped portion increasing and decreasing an inner diameter of the pocket.

(12) A method for manufacturing the rolling bearing retainer of one of the above (8) to (11) by an injection molding using a molding die, the method including:

forming each pocket by a slide core of the molding die.

(13) The method of the above (12), wherein a shape of a processing surface applied to a die surface of the molding die is transferred to an inner diameter surface of the pocket.

(14) The method of the above (12) or (13), wherein a surface of the slide core configured to form the inner peripheral surface of the pocket is formed by any one of shot peening, electric discharge machining and etching.

(15) A rolling bearing having the rolling bearing retainer of one of the above (1) to (6) and (8) to (11).

Effects of the Invention

According to the present invention, at least one of the groove portion and the retainer end face positioned radially inside a surface to be guided is formed with the parting line by the molding die, so that a convex portion (burr) of the parting line does not cause the wear for the retainer or other members. As a result, the wear of the retainer due to friction with the convex portion is suppressed, so that it is possible to prevent a decrease in service life and occurrence of an abnormality such as vibrations. Also, since the chamfered portion of the retainer has the specific surface properties by which the high slidability is to be obtained, it is possible to suppress the wear of the chamfered portion and the outer ring even when the retainer is tilted in the rolling bearing and is thus contacted to the outer ring. Therefore, it is possible to perform the smooth guide even upon high-speed rotation. Further, the retainer is used for the rolling bearing, so that the durability of the rolling bearing can be improved.

Also, according to the present invention, the inner peripheral surface of the pocket has the surface properties where the arithmetic average roughness Ra is 1.0 to 9.8 μm and the maximum height Rt is 10.1 to 102.9 μm, and the thickness of the pocket in the radial direction of the retainer is 3.5 mm or less. For this reason, even when the pocket is formed by the slide core, it is possible to suppress the damage of the micro concave-convex shape on the inner peripheral surface of the pocket. Thereby, it is possible to improve the durability of the retainer without lowering the productivity.

BRIEF DESCRIPTION OF THE DRAWINGS

FIGS. 10A to 10C are partially enlarged views depicting outer diameter surfaces of other retainers.

FIGS. 11A to 11H are enlarged sectional views depicting shapes of diverse pockets of the retainer.

DETAILED DESCRIPTION OF EMBODIMENTS

Hereinafter, embodiments of the present invention will be described in detail with reference to the drawings.

Figure 1:
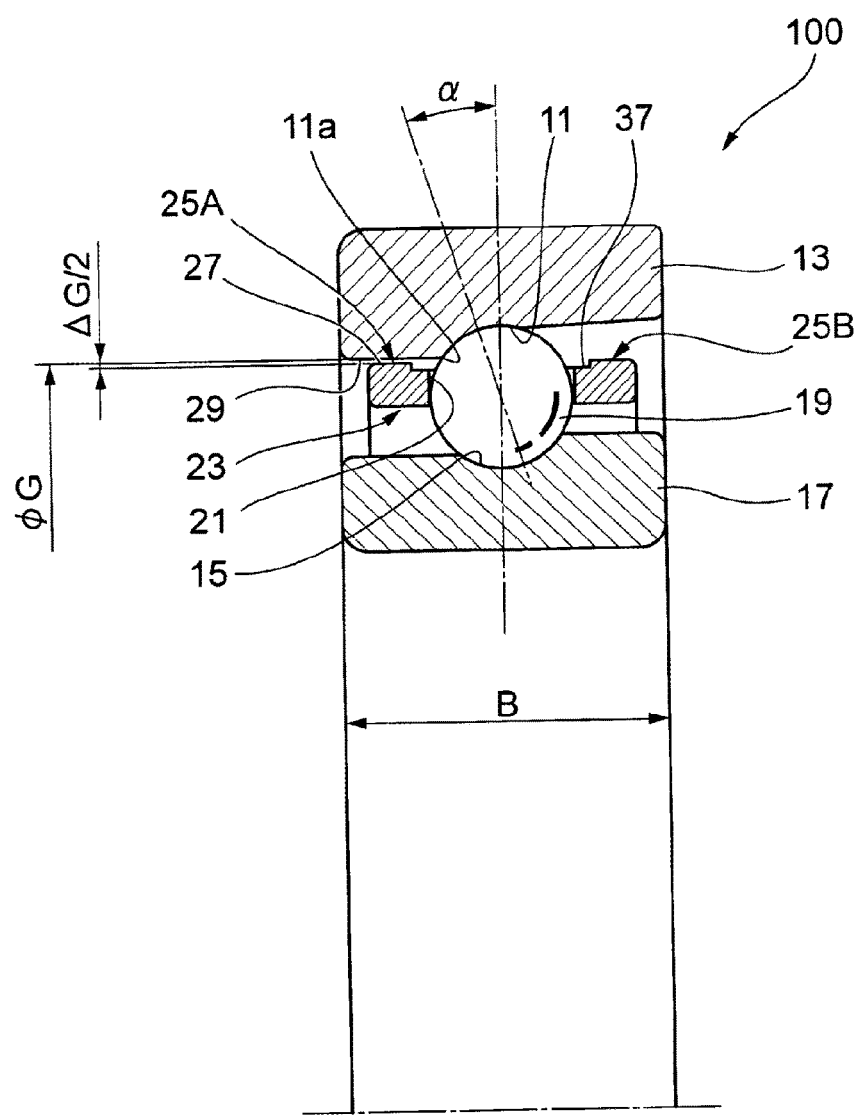
FIG. 1 is a partially sectional view of a rolling bearing, illustrating an embodiment of the present invention.

FIG. 1 is a partially sectional view of a rolling bearing, illustrating an embodiment of the present invention. Herein, as the rolling bearing, an angular ball bearing that is to be used for a high-speed rotation device such as a spindle of a machine tool is exemplified.

An angular ball bearing 100 (hereinafter, also abbreviated as "bearing") includes an outer ring 13 having an outer ring raceway surface 11 on an inner peripheral surface thereof, an inner ring 17 having an inner ring raceway surface 15 on an outer peripheral surface thereof, a plurality of balls (rolling elements) 19, and a retainer (a rolling bearing retainer) 23 having a plurality of pockets 21.

The plurality of balls 19 is arranged with a contact angle α to be freely rollable between the outer ring raceway surface 11 and the inner ring raceway surface 15. The retainer 23 is configured to keep the plurality of balls 19 to be freely rollable in the pockets 21.

The retainer 23 has a plurality of guided portions 25A, 25B protruding radially outwards from both axial ends of an outer diameter surface of the retainer. The guided portions 25A, 25B are arranged at the same circumferential positions with being equally spaced in a circumferential direction.

The angular ball bearing 100 having the above configuration is an outer ring guide type where a guide surface 27 of the guided portion 25A at one axial end-side (a left side in FIG. 1) is guided relative to the outer ring raceway surface 11 of the outer ring 13 by an outer ring inner peripheral surface 29 of a counter bore opposite side.

<Basic Shape of Retainer>

Each of the guided portions 25A, 25B of the retainer 23 has a surface shape having a predetermined surface roughness, as described in detail later. Grease (lubricant) is kept in micro concave portions forming the surface shape, so that slidability of the retainer 23 and the outer ring 13 is improved.

The retainer 23 is a product manufactured by an injection molding where a material including a synthetic resin is used. As the synthetic resin that can be used for the retainer 23, PPS (polyphenylene sulfide), PPS-CF (carbon fiber reinforced polyphenylene sulfide) and the like can be exemplified. In addition, PA (polyamide), PAI (polyamide imide), thermoplastic polyimide, PEEK (polyetheretherketone) or the like can be used as a matrix, and carbon fiber, glass fiber, organic fiber such as aramid fiber, and the like can be used as a reinforced fiber.

Figure 2:
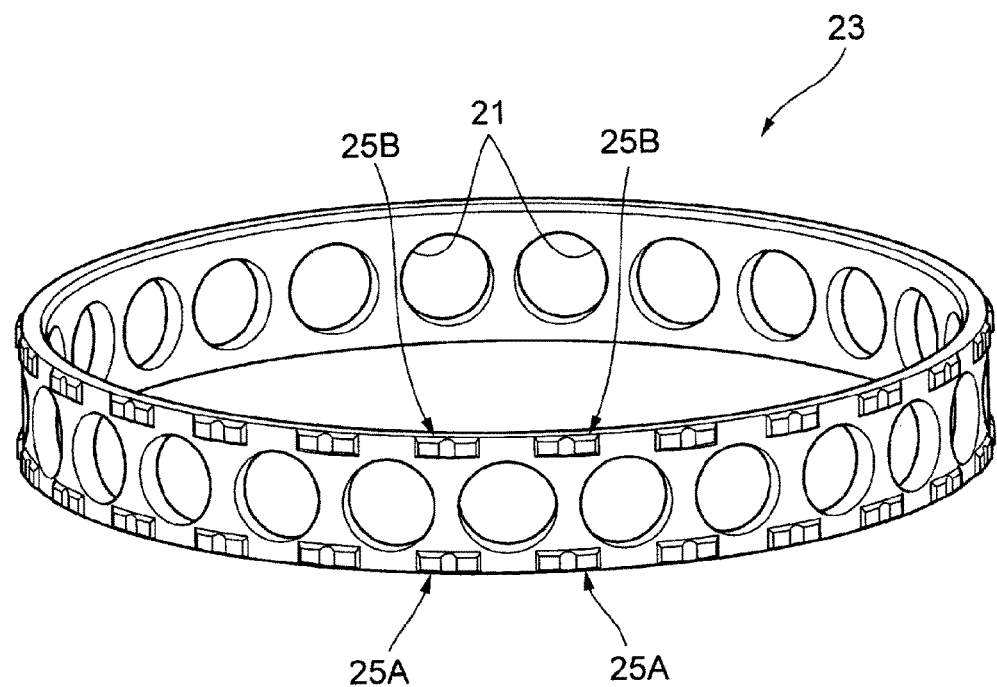
FIG. 2 is an outward perspective view of a retainer.
Figure 3:
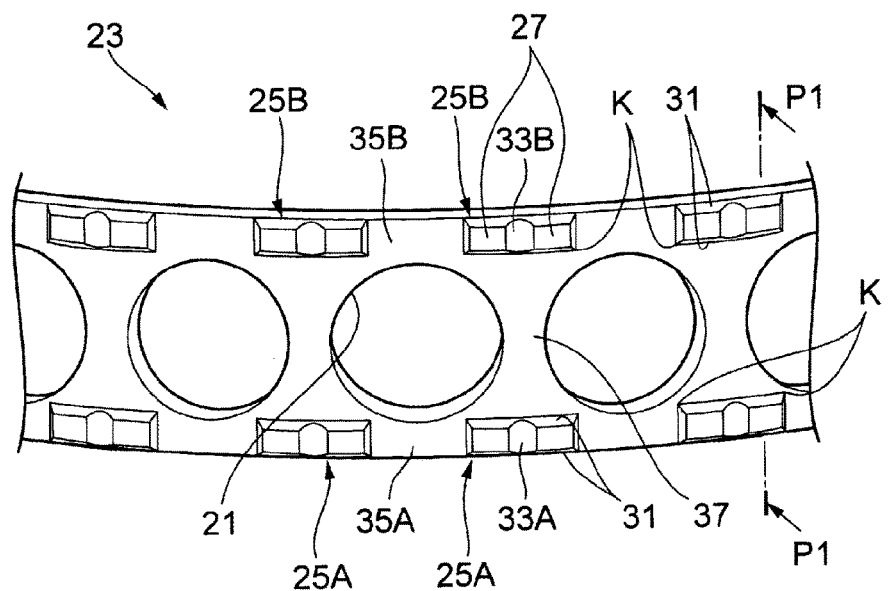
FIG. 3 is a partially enlarged perspective view of the retainer shown in FIG. 2.

FIG. 2 is an outward perspective view of the retainer 23 and FIG. 3 is a partially enlarged perspective view of the retainer shown in FIG. 2. Each of the guided portions 25A, 25B has a guide surface 27, which protrudes radially outwards and is formed to be in slidable contact with the outer ring inner peripheral surface 29 (refer to FIG. 1), and a chamfered portion 31 formed at an edge portion of the guide surface 27. The chamfered portion 31 is provided over an entire circumference of a surrounding edge, which is an edge portion in an axial direction and a circumferential direction of the guide surface 27.

A central portion of the guide surface 27 of the guided portion 25A in the circumferential direction is formed with a groove portion 33A recessed from a radial height of the guide surface 27 and following an axial direction of the retainer 23. Likewise, a central portion of the guide surface 27 of the guided portion 25B in the circumferential direction is also formed with a groove portion 33B recessed from the radial height of the guide surface 27 and following the axial direction of the retainer 23. A sectional shape of each of the groove portions 33A, 33B in the circumferential direction may be a triangular shape, a rectangular shape, a trapezoidal shape or the like, in addition the shown circular arc shape.

In one set of the guided portions 25A, 25B arranged at the same circumferential position, the respective groove portions 33A, 33B are arranged on one line parallel with the axial direction. On the outer diameter surface of the retainer 23, a plurality of sets of the groove portions 33A, 33B in each of which phases of the groove portions in the circumferential direction coincide with each other is arranged along the circumferential direction.

Also, outer diameter grooves 35A, 35B of which radial heights are lower than the guide surface 27 are formed between the guided portions 25A, 25A adjacent to each other in the circumferential direction and between the guided portions 25B, 25B. Each of the outer diameter grooves 35A, 35B functions as a discharge groove of the lubricant.

Figure 4:
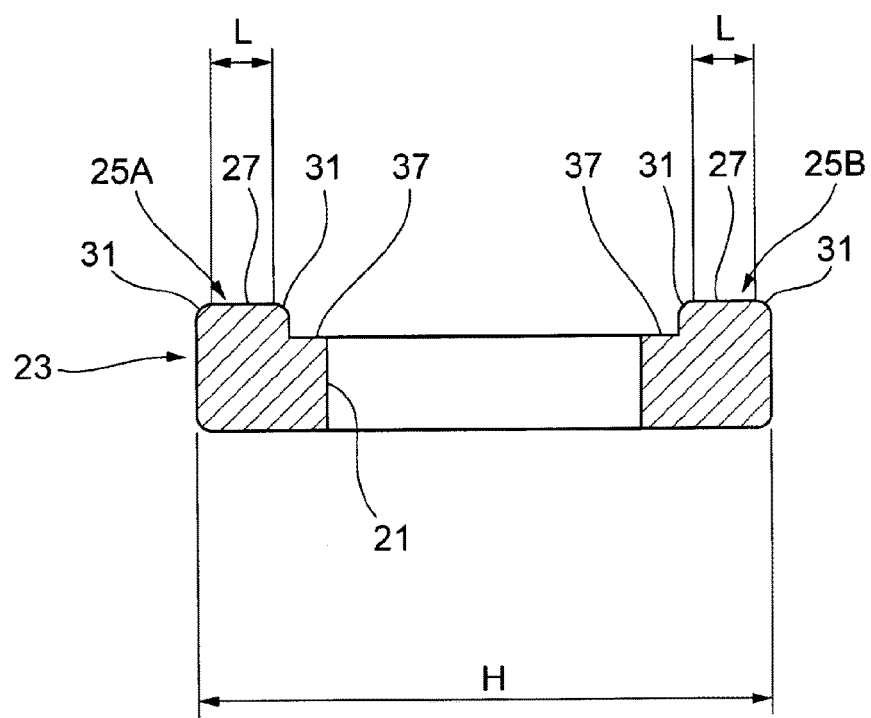
FIG. 4 is an enlarged sectional view taken along a line P1-P1 of the retainer shown in FIG. 3.

FIG. 4 is an enlarged sectional view taken along a line P1-P1 of the retainer 23 shown in FIG. 3. The chamfered portion 31 formed at the axial edge portion of the guide surface 27 has a curved surface of which a radius of curvature is 0.2 mm or greater.

In general, as shown in FIG. 1, the retainer 23 arranged in the bearing freely movable within ranges of a guide gap ΔG/2 between the guide surface 27 and the outer ring inner peripheral surface 29 and a pocket gap. For this reason, the retainer 23 may be axially tilted, so that the surrounding edge of the guide surface 27 may be partially contacted to the outer ring 13. When the partial contact occurs, the retainer 23 is worn, so that the service life is shortened and an abnormality such as vibration deterioration occurs. At this time, the wear of the retainer 23 progresses from the surrounding edge of the guide surface 27, in most cases. However, according to the retainer 23, since the surrounding edge of the guide surface 27 is configured as the chamfered portion 31 of which corner portion is smoothened, the wear is difficult to progress.

Also, in general, in the angular ball bearing 100 of the outer ring guide type, the retainer 23 may be contacted to a raceway surface edge 11a, which is a boundary between the outer ring inner peripheral surface 29 and the outer ring raceway surface 11 of the outer ring 13 (refer to FIG. 1). When the retainer 23 is contacted to the raceway surface edge 11a, the retainer 23 is worn from the contact part with the raceway surface edge 11a, as described above. Therefore, as shown in FIGS. 1 and 4, the retainer 23 is provided with an edge relief part 37 recessed radially inwards in a region facing the raceway surface edge 11a, which is an axial edge portion of the outer ring raceway surface 11 of the outer ring 13, so as to prevent the contact with the raceway surface edge 11a.

The edge relief part 37 corresponds to a region between the guided portions 25A and 25B shown in FIG. 3, and is formed to be lower by one step from the radial height of the guide surface 27. By the step, even when the retainer 23 is tilted, the raceway surface edge 11a is not contacted to the retainer 23, so that it is possible to prevent the wear of the retainer 23, which is to be caused due to the contact with the raceway surface edge 11a.

Also, the guide surface 27 and the chamfered portion 31 are formed with a surface property of a micro concave-convex shape. In the concave portions of the micro concave-convex shape, the lubricant such as grease is accumulated, so that a contact resistance is reduced upon contact with the outer ring 13 and the progress of the wear is thus suppressed. In order to form the surface property, it is necessary to smoothly connect the guide surface 27 and the chamfered portion 31.

Figure 5A:
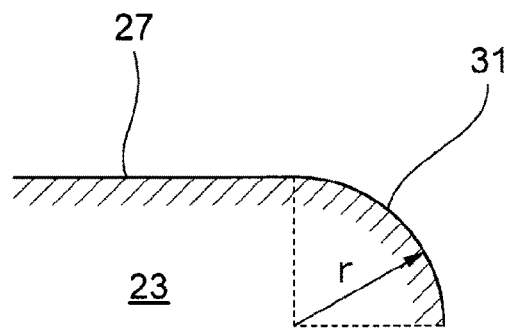
FIGS. 5A to 5C are enlarged sectional views depicting a shape of a chamfered portion.
Figure 5B:
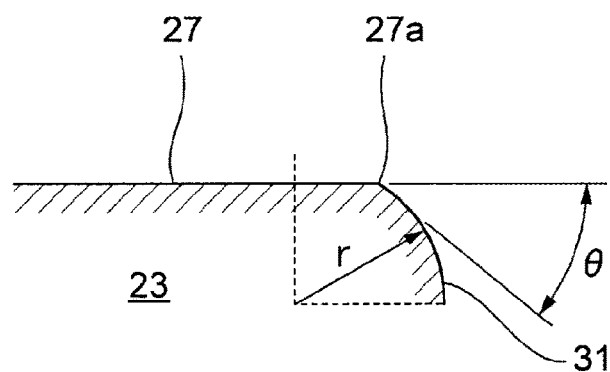
Figure 5C:
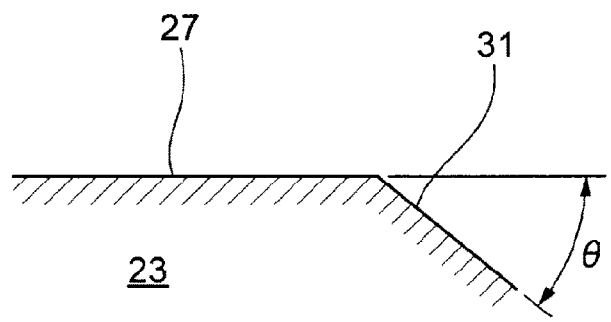

FIGS. 5A to 5C are enlarged sectional views depicting a shape of the chamfered portion 31. The chamfered portion 31 shown in FIG. 5A is configured as a curved surface of which a radius of curvature r is 0.2 mm or greater. Thereby, the surrounding edge of the guide surface 27 does not rise, so that the guide surface 27 and the curved surface are smoothly connected.

Also, as shown in FIG. 5B, the chamfered portion 31 may have a configuration where a center of the radius of curvature r of the chamfered portion 31 is brought close to the guide surface 27, so that a tangential direction of the curved surface of the chamfered portion 31 and the guide surface 27 intersect with each other and the chamfered portion 31 is connected to the edge portion 27a of the guide surface 27 in the tangential direction. An angle θ between the tangential direction of the curved surface connected to the edge portion 27a and the guide surface 27 is preferably 20° or less ($0°<θ≤20°$).

Also, as shown in FIG. 5C, the chamfered portion 31 may be configured as an inclined surface of which an angle θ to the guide surface 27 in an axial section of the retainer 23 is 20° or less ($0°<θ≤20°$). In this case, it is possible to reduce a surface pressure to be applied to the retainer 23, to prevent occurrence of a dent and to suppress the progress of the wear.

The shapes of the chamfered portion 31 are exemplary, the present invention is not limited thereto and any shape can be made. Preferably, the chamfered portion 31 may be configured as a curved surface shape (R shape) so that a tangential line of the curved surface and the guide surface 27 are to be smoothly connected.

Also, as shown in FIG. 1, the radial guide gap ΔG/2 between the outer ring inner peripheral surface 29 of the outer ring 13 and the guide surface 27 of the retainer 23 highly influences occurrence of a retainer sound, an asynchronous run-out (NRRO), dynamic torque and the like upon high-speed rotation. When the guide gap ΔG/2 is set to a range of 0.2% to 0.8% of a guide diameter φG of the outer ring inner peripheral surface 29, it is possible to reduce the NRRO and dynamic torque of the bearing upon high-speed rotation.

In the case of the outer ring guide retainer, the guide diameter φG is changed due to a centrifugal force to be applied upon rotation and thermal expansion. When the initial guide gap is small, the guide gap becomes zero (0) upon rotation, so that the torque may be increased, the temperature may rise and a failure and an abnormal sound may be caused. For this reason, the guide gap ΔG/2 is preferably set to 0.2% or greater of the guide diameter φG.

Also, since a rotation diameter of the retainer 23 upon rotation of the bearing is determined by the guide gap ΔG/2, contact load of the guide surface increases in proportion to the guide gap ΔG/2. Further, when the guide gap ΔG/2 is excessively large, the retainer 23 vibrates in the bearing, so that the retainer sound is generated. For this reason, the guide gap ΔG/2 is preferably set to be less than 0.8% of the guide diameter φG.

When the retainer 23 of which the guide gap ΔG/2 is set to 0.8% or less of the guide diameter φG is incorporated in the bearing and used with grease lubrication, the discharge of the grease is interrupted. Such retainer 23 is a defective product because it takes long time for a running-in operation. The running-in operation time can be shortened by including the pockets 21 of the retainer 23 in the region of the outer diameter grooves 35A, 35B, in other words, providing the outer diameter grooves 35A, 35B at sides of the pockets 21 in the axial direction of the bearing.

<Molding Die of Retainer>

Subsequently, a molding die for injection-molding the retainer 23 is described.

Figure 6B:
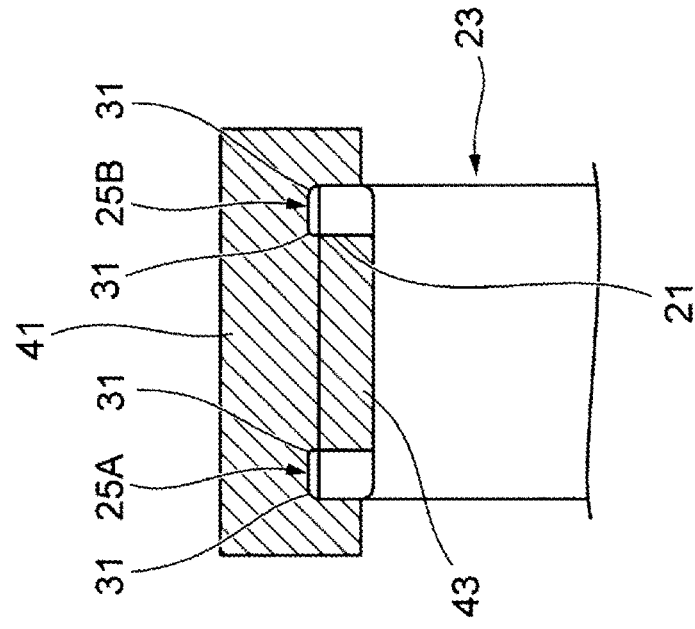
FIG. 6A schematically illustrates an example of a molding die and FIG. 6B is a sectional view taken along a line P2-P2 of FIG. 6A.
Figure 6A:
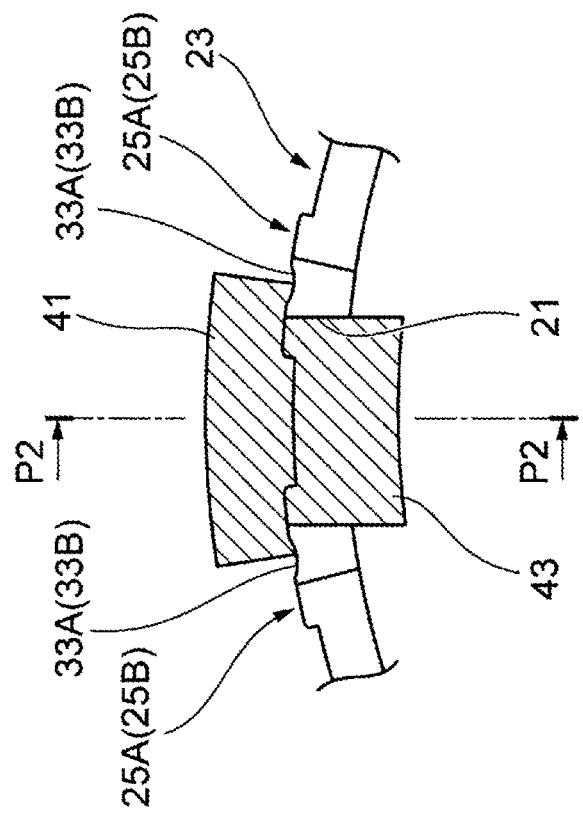

The synthetic resin retainer 23 is formed using a molding die. FIGS. 6A and 6B schematically depict an example of the molding die. FIG. 6A depicts an outer die 41 for forming the outer diameter surface of the retainer 23 and a slide core 43 for forming the pocket 21 of the retainer 23. FIG. 6B is a sectional view taken along a line P2-P2 of FIG. 6A. The molding die has an inner die for forming the inner diameter surface of the retainer 23 and the like, in addition to the die members, but the descriptions thereof are herein omitted.

The molding die shown in FIGS. 6A and 6B is an axial draw-type die. A plurality of the outer dies 41 is arranged along the circumferential direction of the retainer 23 and forms the guided portions 25A, 25B of the retainer 23. Each outer die 41 is configured to be radially moveable. The circumferential positions of the groove portions 33A (33B) of the guided portions 25A, 25A (25B, 25B) are parting lines with the adjacent outer dies.

In the shown example, one outer die 41 is configured to form circumferential halves of the pair of guided portions 25A, 25A (25B, 25B) adjacent to each other. However, a plurality of guided portions may also be additionally formed by one die member.

<Surface Properties of Retainer>

A die surface of the molding die corresponding to the guide surfaces 27 and the chamfered portions 31 of the guided portions 25A, 25B of the retainer 23 is configured as a processing surface having a predetermined surface roughness greater than usual. A surface shape of the processing surface of the die surface is transferred to surfaces of the guide surfaces 27 and the chamfered portions 31 of the retainer 23 to be injection-molded.

The shape-transferred surfaces of the guide surface 27 and the chamfered portion 31 of the retainer 23, to which the shape of the processing surface of the die surface has been transferred, have a surface roughness that an arithmetic average roughness Ra prescribed in JIS (Japanese Industrial Standard) B0601 is set to 1.0 to 9.8 μm and a maximum height Rt is set to 10.1 to 102.9 μm (regarding the numerical values of Ra and Rt, refer to Japanese Patent Application Publication No. 2014-95469A, as required)

Thereby, the grease (lubricant) is kept in concave portions forming the predetermined surface roughness, and the grease is supplied from the concave portions to a contact interface between the guide surface 27 of the retainer 23 and the outer ring inner peripheral surface 29 of the outer ring 13 (refer to FIG. 1). Therefore, even when the lubrication conditions become severe as the bearing rotates at high speed, an oil film at the contact interface is not discontinued on the way. For this reason, it is possible to suppress the rapid temperature rising and seizing of the bearing for a long time.

The retainer 23 may be reinforced by mixing a filler such as glass fiber and carbon fiber in the resin material so as to improve the wear resistance and the mechanical strength. In this case, wear powders including the filler may be generated at the contact interface between the guide surface 27 of the retainer 23 and the outer ring inner peripheral surface 29 of the outer ring 13. The wear powders act as foreign matters upon rotation of the bearing, so that cutting wear may increase. However, according to the above configuration, a concavity and convexity of a predetermined surface roughness is formed in a direction parallel with a direction in which the retainer 23 and the ball 19 is to be guided, i.e., along the circumferential direction of the retainer 23. By the concavity and convexity, the generated wear powders are easily discharged from the contact interface. Therefore, the wear resistance of the retainer 23 is improved. Also, when the surface roughness in a direction orthogonal to the guide direction and the surface properties of the concavity and convexity are set within the above-described range, the wear resistance of the retainer 23 can be further improved.

In the meantime, when the arithmetic average roughness Ra of the guide surface 27 and the chamfered portion 31 is less than 1.0 μm, an amount of the grease to be kept in the concave portions forming the surface roughness is reduced, so that an amount of the grease to be supplied to the contact interface between the guide surface 27 of the retainer 23 and the outer ring inner peripheral surface 29 of the outer ring 13 is not sufficient. Also, when the arithmetic average roughness Ra exceeds 9.8 μm, the roughness itself may badly influence rotation precision of the bearing for spindle of a machine tool, for which the high-speed rotation of high precision is required.

The surface roughness of the guide surface 27 and the chamfered portion 31 has the maximum height Rt set within a range of 10.1 to 102.9 μm. The maximum height Rt is set within the corresponding range, so that occurrence of specifically high mountain portions and low valley portions is suppressed. Thereby, the vibrations are suppressed upon the sliding, so that it is possible to improve the bearing performance.

As described above, the surface properties of the guide surface 27 and the chamfered portion 31 of the retainer 23 are given by the shape transfer of the die surface upon the injection molding of the retainer 23. For this reason, the guide surface 27 and the chamfered portion 31 are formed with a surface layer (a shape-transferred layer) in a uniform and highly-reproducible manner, so that it is possible to more securely improve the wear resistance of the retainer 23.

The processing surface (an emboss processing surface) having a predetermined surface roughness of the molding die may be formed by any one of shot processing such as shot peening, electric discharge machining, etching, water jet, laser processing and the like. In the meantime, the processing surface may be formed by the individual method or a combination of the methods and may also be formed by a processing method except for the above methods. The surface shape of the processing surface may be a concave shape such as dimple or a surface shape consisting of micro grooves.

Also, when at least the guide surface 27 and the chamfered portion 31 of the retainer 23 are provided with the shape-transferred surface of the above surface roughness, the outer peripheral surface and the inner peripheral surface of the retainer 23 or the entire surface of the retainer may be formed with the shape-transferred surface.

Regarding the retainer 23 having the shape-transferred surface, if the burr formed on the surface of the retainer 23 is removed by barrel processing or the like, the shape-transferred surface is also removed, so that the grease cannot be kept. Therefore, in the above configuration, the parting lines causing the burr are not removed by post-processing and the parting lines are arranged at positions at which the burr does not influence even though the burr is formed. Thereby, it is possible to increase the productivity without complicating the processing process of the retainer 23.

According to the retainer 23 having the above configuration, the retainer surface is formed to have the specific surface shape and the convex portions resulting from the parting lines are not arranged at the sliding portions, so that the slidability and wear resistance of the retainer 23 are improved. Also, it is possible to easily mass-produce the retainer 23 by the injection molding in which the post-processing such as cutting processing is not required. Therefore, it is possible to improve both the durability and productivity of the retainer 23.

<Configurations of Other Molding Dies>

In the below, other molding dies are described.

Figure 7:
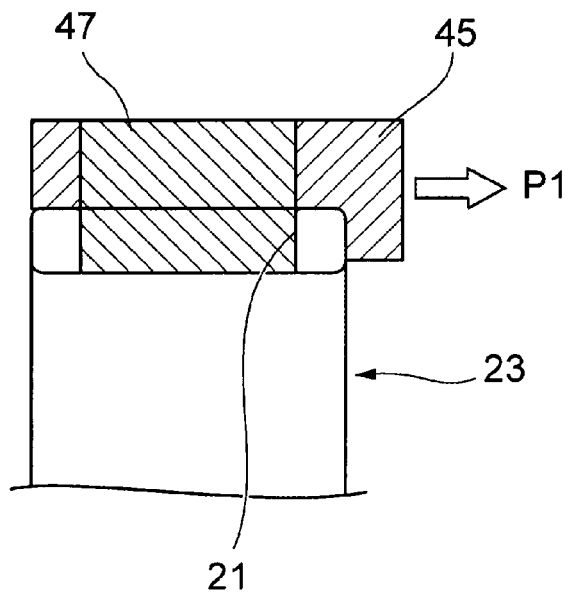
FIG. 7 schematically illustrates another configuration example of the molding die.

FIG. 7 schematically depicts another configuration example of the molding die. The molding die has an outer die 45 for forming the outer diameter surface-side of the retainer 23 and a slide core 47 for forming the pocket 21 of the retainer 23. The molding die has an inner die for forming the inner diameter surface-side of the retainer 23 and the like, in addition to the die members, but the descriptions thereof are herein omitted. Meanwhile, in below descriptions, the same members as the members of FIG. 1 are denoted with the same reference numerals and the descriptions thereof are omitted or simplified.

The molding die is configured to form the pocket 21 by radially sliding the slide core 47. Also, the outer die 45 is a radial draw type and is configured to slide in a P1 direction of FIG. 7 at a state where the slide core 47 is taken out of the pocket 21. Thereby, the outer diameter surface of the retainer 23 is formed.

Figure 8:
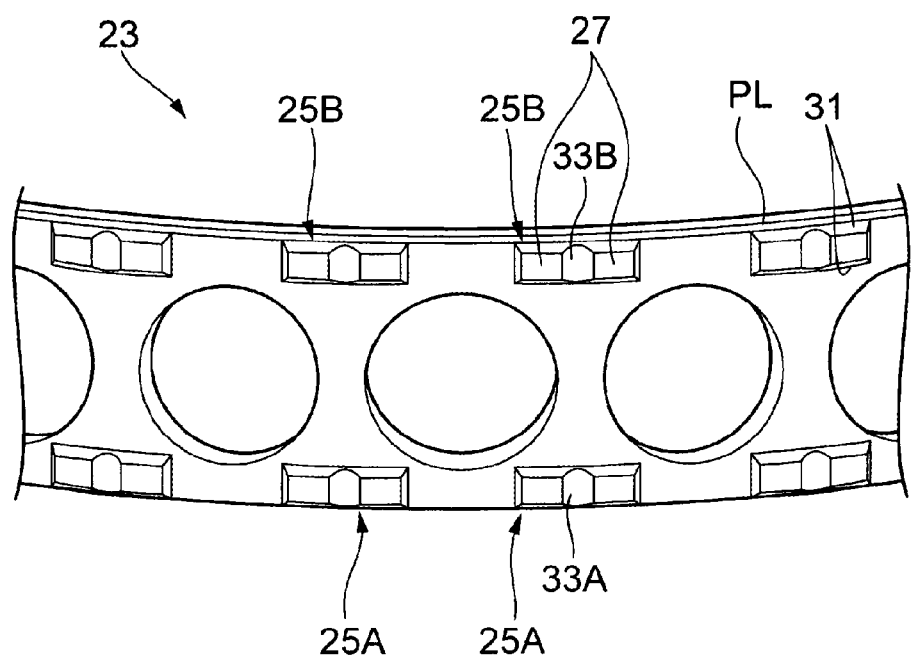
FIG. 8 is a partially enlarged perspective view of the retainer.
Figure 9A:
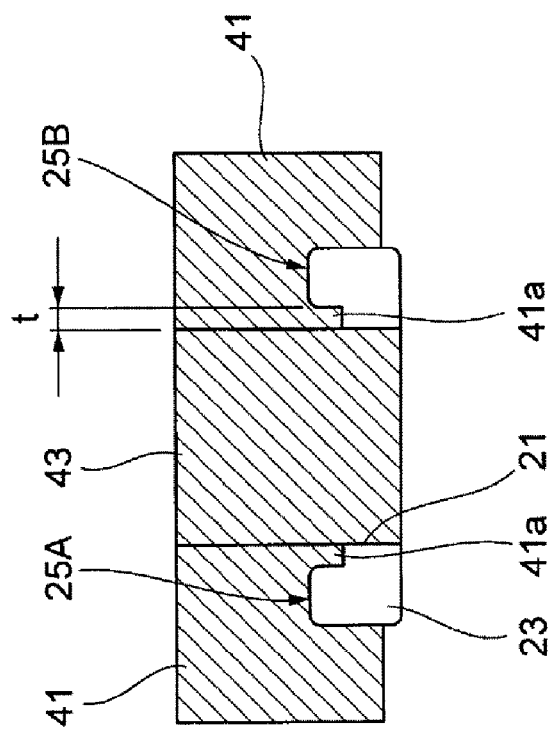
FIG. 9A is an enlarged view of an outer diameter surface of the retainer and FIG. 9B is a sectional view taken along a line P3-P3 of FIG. 9A, schematically depicting the molding die.
Figure 9B:
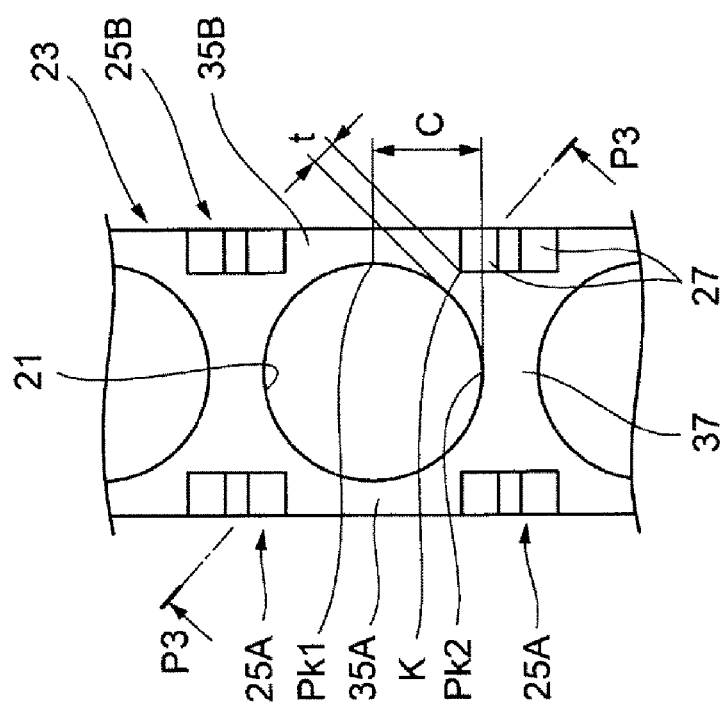

When the retainer 23 is formed using the molding die having the above configuration, a parting line PL of the retainer 23 is formed on an end face of the retainer 23 and is not formed at the guided portions 25A, 25B and the chamfered portion 31, as shown in FIG. 8. Even when the burr exists at the retainer end face, the burr is not contacted to the outer ring 13 and the inner ring 17 of the angular ball bearing 100 shown in FIG. 1, so that the burr does not influence the bearing performance.

Therefore, when the retainer 23 is formed using the molding die having the above configuration, the wear of the retainer 23 is suppressed and the durability of the rolling bearing can be improved.

The oil air lubrication is also the same. That is, when the guide gap is excessively small, the discharging property of the oil is deteriorated, so that an abnormal temperature rising and a seizing are caused. On the other hand, when the guide gap is large, the discharging of the grease is not interrupted and the outer diameter groove may not be provided.

Also, as shown in FIG. 4, when a guide width L (a width of a straight part except for the chamfered portion 31) of the guide surface 27 is reduced, it is possible to reduce torque of a rotation resistance of the retainer 23. However, when the guide width L is smaller than 0.5 mm, the contact surface pressure with the outer ring inner peripheral surface 29 increases. In this case, the wear progresses, so that the durability of the bearing is lowered. For this reason, the guide width L of the guide surface 27 is set to 0.5 mm or greater.

Also, when an axial width of the outer ring 13 is denoted with B (refer to FIG. 1), a width H (refer to FIG. 4) of the retainer 23 is preferably set to H/B≤0.95, from standpoints of securement of a space volume and weight saving. Also, the width is preferably set to 0.4≤H/B so as to secure a minimum thickness t (refer to FIG. 10B) of a pocket opening of the retainer 23 (which will be described later).

In the below, the molding die for securing the minimum thickness t of the pocket opening of the retainer 23 is described.

FIG. 10A is an enlarged view of the outer diameter surface of the retainer. FIG. 10B is a sectional view taken along a line P3-P3 of FIG. 10A, schematically depicting the molding die. In FIG. 10B, an outer die 41 for forming an outer diameter part of the retainer 23 and a slide core 43 for forming the pocket 21 of the retainer 23 are shown. The shown molding die has an inner die for forming the inner diameter surface of the retainer 23 and the like, in addition to the die members, but the descriptions thereof are herein omitted.

The molding die shown in FIG. 10B is an axial draw-type die. A plurality of the outer dies 41 and the slide cores 43 is arranged along the circumferential direction of the retainer 23 and is configured to be radially moveable. The circumferential positions of the groove portions 33A (33B) of the guided portions 25A, 25A (25B. 25B) are parting lines with the adjacent outer dies.

As shown in FIGS. 10A and 10B, the outer diameter surface of the retainer 23 including the guided portions 25A, 25B, the outer diameter grooves 35A, 35B and the edge relief parts 37 is formed by the outer dies 41. Also, the pockets 21 are formed by the slide cores 43. As described later, the predetermined surface properties of the surfaces of the slide cores 43 are transferred to the inner peripheral surfaces of the pockets 21 of the retainer 23.

The processing surface (an emboss processing surface) having the predetermined surface properties of the slide core 43 may be formed by any one of shot processing such as shot peening, electric discharge machining, etching, water jet, laser processing and the like. In the meantime, the processing surface may be formed by the individual method or a combination of the methods and may also be formed by a processing method except for the above methods.

Since corner portions K of the guided portions 25A, 25B and the pockets 21 (the inner peripheral surfaces) come close to each other, a minimum thickness t of a convex portion 41a of the outer die 41 for forming a coupling portion thereof is small. Like this, when the die has a part of which the minimum thickness t is small, the die strength is insufficient, so that the die may be deformed or fractured.

For this reason, as shown in FIG. 10A, circumferential phases of the corner portions K of the guided portions 25A. 25B are provided in a region C between a circumferential position Pk1 at which the axial diameter of the pocket 21 is largest and a circumferential position Pk2 becoming a circumferential end portion of the pocket 21. A minimum distance (the minimum thickness t) between the corner portion K of each of the guided portions 25A, 25B and the inner peripheral surface of the pocket 21 is set to 0.5 mm or greater. Thereby, a part of the die at which the thickness is particularly thinned is removed, so that it is possible to prevent a problem, which is to be caused due to the lack of the die strength.

FIGS. 11A to 11C are partially enlarged views depicting outer diameter surfaces of other retainers formed by a die of which a thin part is corrected. In the retainer shown in FIG. 11A, the corner portions K of the guided portions 25A, 25B are formed to have a chamfered shape having a curved surface shape, so that the minimum thickness t of the die is increased.

In the retainer shown in FIG. 11B, the corner portions K of the guided portions 25A, 25B are obliquely cut, so that the minimum thickness t of the die is increased.

Also, the retainer shown in FIG. 11C is the retainer 23 (refer to FIG. 16) that has the guide gap ΔG/2 of a usual magnitude (for example, 0.8% or greater of the guide diameter φG of the outer ring inner peripheral surface 29) and it is not necessary to provide the outer diameter grooves 35A, 35B. In the retainer 23, the guided portions 26A, 26B are provided with being axially spaced from the pockets 21, so that a minimum distance (the minimum thickness t) between each of the guided portions 26A, 26B and the pocket 21 is set to 0.5 mm or greater.

All the shown retainers can prevent a problem, which is to be caused due to the lack of the die strength.

<Surface Properties of Pocket Inner Peripheral Surface>

In the below, a retainer of which the pocket inner peripheral surface is formed to have surface properties of a micro concave-convex shape is described.

The inner peripheral surface of the pocket 21 of the retainer 23 is a cylindrical surface formed along the radial direction of the retainer, and the cylindrical inner peripheral surface is formed to have predetermined surface properties. In the micro concave portions forming the surface properties, the grease (lubricant) is kept, so that the slidability of the pocket 21 relative to the ball 19 is improved.

In order to form the retainer 23 having the above configuration, a molding die of which a surface of the die (the slide core 43) for forming the pocket 21 in the retainer 23 has predetermined surface properties is used. That is, the die surface of the slide core 43 is configured as a processing surface having a predetermined surface roughness greater than usual. A surface shape of the processing surface is transferred to the inner peripheral surface of the pocket 21 of the retainer 23 to be injection-molded. Thereby, the inner peripheral surface of the pocket becomes a shape-transferred surface (for example, an embossed surface) corresponding to the shape of the processing surface.

The shape-transferred surface of the inner peripheral surface of the pocket 21 of the retainer 23, to which the shape of the processing surface of the die surface has been transferred, has a surface roughness that an arithmetic average roughness Ra prescribed in JIS B0601 is set to 1.0 to 9.8 μm and a maximum height Rt is set to 10.1 to 102.9 μm (regarding the numerical values of Ra and Rt, refer to Japanese Patent Application Publication No. 2014-95469A, as required).

Thereby, the grease (lubricant) is kept in the concave portions forming the predetermined surface roughness, and the grease is supplied from the concave portions to a contact interface between the inner peripheral surface of the pocket 21 and the ball 19 (refer to FIG. 1). Therefore, even when the lubrication conditions become severe as the bearing rotates at high speed, an oil film at the contact interface is not discontinued on the way. For this reason, it is possible to suppress the rapid temperature rising and seizing of the bearing for a long time.

Also, the surface shape of the processing surface may be a concave shape such as dimple or a micro groove, in addition to the random micro concave-convex shape.

When the arithmetic average roughness Ra is smaller than 1.0 μm, an amount of the grease to be kept in the concave portions forming the surface roughness is reduced, so that an amount of the grease to be supplied to the contact interface between the inner peripheral surface of the pocket 21 of the retainer 23 and the ball 19 is not sufficient. Also, when the arithmetic average roughness Ra exceeds 9.8 μm, the roughness itself may badly influence the rotation precision of the bearing for spindle of a machine tool, for which the high-speed rotation of high precision is required.

The surface roughness that is to be given to the inner peripheral surface of the pocket 21 has the maximum height Rt set within a range of 10.1 to 102.9 μm. The maximum height Rt is set within the corresponding range, so that occurrence of specifically high mountain portions and low valley portions is suppressed. Thereby, the vibrations are suppressed upon the sliding, so that it is possible to improve the bearing performance.

As described above, the surface properties of the inner peripheral surface of the pocket 21 are given by the surface shape transfer of the slide core 43 upon the injection molding of the retainer 23. For this reason, the inner peripheral surface of the pocket 21 is formed with a surface layer (a shape-transferred layer) in a uniform and highly-reproducible manner, so that it is possible to more securely improve the wear resistance of the retainer 23.

Also, the retainer 23 having the above configuration may have the surface properties of the micro concave-convex shape at the guide surface 27 and the chamfered portion 31, too. In this case, by the synergetic effect of the respective surface properties of the guide surface 27, the chamfered portion 31 and the inner peripheral surface of the pocket 21, it is possible to more securely suppress the wear of the retainer 23 and to perform the smoother guide upon high-speed rotation.

<Formation of Pocket>

Usually, the pocket 21 of the retainer 23 of the outer ring guide type has a cylindrical shape along the radial direction. For this reason, when taking out the slide core 43 having the surface shape of the surface properties in the radially outward direction, the surface shape given to the inner peripheral surface of the pocket 21 may be collapsed by shear.

Table 1 shows a result obtained by observing states of the surface shape of PPS-CF resin with a microscope in a case where the retainer 23 is formed using a die of which a cylindrical part having a diameter of 95 mm is processed to have an arithmetic average roughness Ra 3 μm by a shot method and the die is drawn in parallel with the surface shape-transferred surface over a distance of 16 mm.

Figure 12:
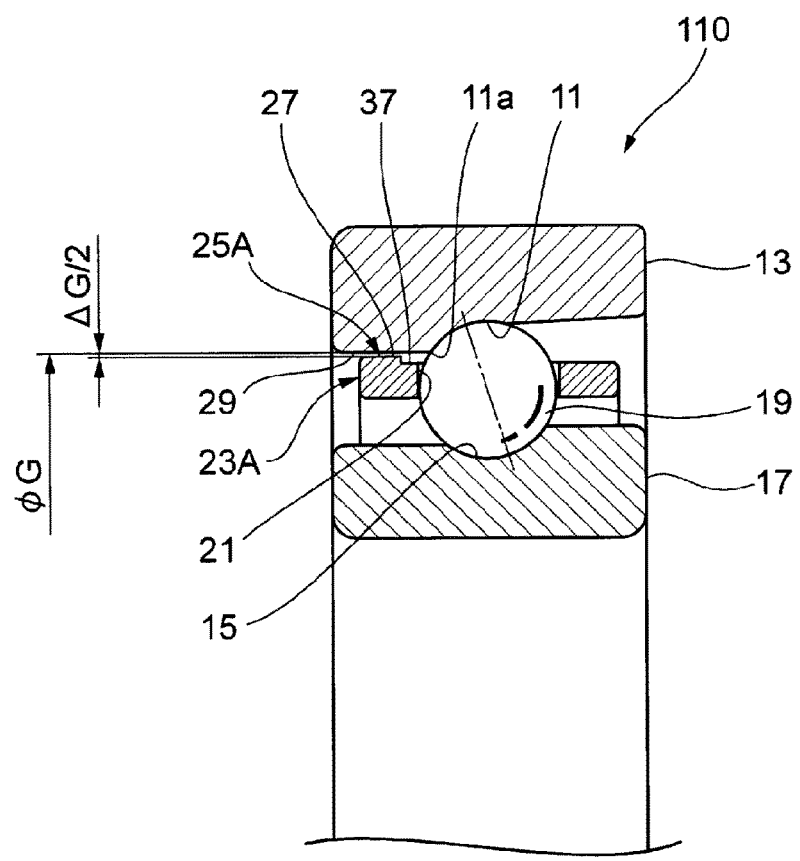
FIG. 12 is a partially sectional view of an angular ball bearing having a retainer of another configuration.

When the drawing length is 3.5 mm or smaller, the surface shape transferred from the die remains unchanged. When the drawing distance is within a range of 3.5 to 4.5 mm, the surface shape of 80% or greater transferred from the die remains. However, when the drawing distance is 4.5 mm or greater, the surface is cut by the shear with the die and the surface shape of the predetermined surface roughness transferred from the die is fractured. Therefore, a length D (refer to FIG. 12) of the inner peripheral surface of the pocket 21 corresponding to the drawing distance of the die in the shear direction, i.e., a thickness of the cylindrical surface of the pocket 21 in the radial direction of the retainer is preferably set to 4.5 mm or smaller, and more preferably 3.5 mm or smaller.

TABLE 1

| Drawing distance mm | Surface state |
| --- | --- |
| 0 to 3.5 | Unchanged |
| 3.5 to 4.5 | surface shape of 80% or greater remains |
| 4.5 or greater | the surface shape is cut upon drawing |

When the radial length D of the inner peripheral surface of the pocket 21 is large, the drawing distance is large, the surface shape to be given is large, the surface shape of the inner peripheral surface of the pocket 21 is damaged due to the drawing or the die is worn, the service life of the retainer may be shortened. In this case, instead of the shape shown in FIG. 12A, a radially inner pocket diameter d1 of the retainer 23, which is not in contact with the ball 19, is preferably reduced, as shown in FIG. 12B. Alternatively, as shown in FIG. 12C, a radially outer pocket diameter d2 of the retainer 23, which is not in contact with the ball 19, is preferably increased.

When the retainer inner diameter-side or the retainer outer diameter-side is provided with a stepped portion 22 of increasing/decreasing an inner diameter of the pocket, it is possible to reduce the substantial drawing distance (a sliding distance with being in contact) and to suppress the damage of the surface shape to be transferred from the slide core 43.

Also, as shown in FIG. 12D, the radially inner pocket diameter d1 of the retainer 23 may be decreased and the radially outer pocket diameter d2 may be increased. In this case, it is possible to further reduce the drawing distance.

Also, as shown in FIG. 12E, the entire inner peripheral surface of the pocket 21 may be formed as a tapered surface of which a diameter increases from the inner periphery-side towards the outer periphery-side with a taper angle θ of 0.5° or greater. In this case, when drawing the slide core 43, the shear is not caused, so that it is possible to protect the surface shape of the pocket. Also, it is possible to increase the service life of the slide core.

In FIG. 12F, the radially inner pocket diameter d1 is reduced and a tapered surface 21a is formed. In FIG. 12F, the radially outer pocket diameter d2 is increased and the tapered surface 21a is formed. In FIG. 12H, the radially inner pocket diameter d1 is decreased, the radially outer pocket diameter d2 is increased and the tapered surface 21a is formed. In this way, the shape of the inner peripheral surface of the pocket 21 is formed as a shape by which the drawing distance is to be substantially shortened, so that it is possible to suppress the damage of the resin upon the drawing of the slide core 43 and to prolong the service life of the die.

As described above, the pocket portion is applied with the shear force upon the drawing of the slide core 43. For this reason, the service life of the outer die 41 for forming the outer diameter part of the retainer 23 and the service life of the slide core 43 for forming the pocket 21 of the retainer 23 may be considerably different. However, according to the above die configuration, the expensive outer die 41 having the complicated shape is continuously used as it is, and the slide core 43 is configured as a separate member from the outer die 41. For this reason, only the inexpensive slide core 43 having a pin shape has only to be replaced, so that it is possible to reduce the running cost of the die.

In the meantime, the micro concave-convex shapes of the guide surface 27 and the chamfered portion 31 may have the arithmetic average roughness Ra of 1.0 to 9.8 μm and the maximum height Rt of 10.1 to 102.9 μm, like the inner peripheral surface of the pocket 21. Also, the micro concave-convex shape is formed by performing the processing on the die surface, like the surface processing method of the slide core 43.

<Skim Layer of Retainer Surface>

When forming the retainer 23 by the injection molding, the high-temperature resin is contacted to the low-temperature die and is thus rapidly cooled. For this reason, a part of the surface of the retainer 23 becoming a part adjacent to the die is formed with an amorphous layer referred as a skin layer. Also, upon the forming, the resin flows in parallel with the resin surface, so that the reinforced fibers (CF (carbon fiber)), GF (glass fiber), AF (aramid fiber) and the like) are also aligned in parallel in the surface layer part in the resin after the formation.

When the resin material is PPS (polyphenylene sulfide), PEEK (polyetheretherketone) or the like, the amorphous layer is crystallized up to a part adjacent to the surface and thus has a very small thickness of about 0.1 to 10 μm. When the resin material is a polyamide resin such as nylon, the amorphous layer is likely to be formed and has a thickness of about 10 to 30 μm.

The reinforced fiber has significant aggressiveness to the steel material of the outer ring, the inner ring and the rolling elements to slide relative to the retainer. In particular, when a surface, which was subjected to the barrel processing or cutting processing for burr removal, of the resin material including the reinforced fibers is configured as a slide surface, the reinforced fibers are precipitated in a direction intersecting with the resin surface. For this reason, the reinforced fibers have acute end portions, so that the end portions may damage the outer ring, the inner ring and the rolling elements and cause the wear. Also, since the reinforced fibers appear in the retainer surface layer, the reinforced fibers may be dropped out, which lowers the service life of the bearing.

Therefore, when the retainer surface layer is provided with the skin layer, it is possible to prevent the dropout of the reinforced fibers and the aggressiveness to the other member due to the precipitated reinforced fibers.

Also, since the reinforced fibers are aligned in parallel in the retainer surface, even after the skin layer is removed by the wear or the like, the end portions of the reinforced fibers are not contacted to the outer ring, the inner ring and the rolling elements at an acute angle. Thereby, it is possible to suppress the wear of the other member.

The skin layer preferably exists in a range of 30 μm or less from the surface, as disclosed in Japanese Patent Application Publication No. 2001-227548A. Also, as described above, since the skin layer is required to be in the surface layer part, the retainer surface layer is preferably formed with the amorphous layer of which thickness from the retainer surface is 0.1 to 30 μm and does not include the reinforced fibers.

Other Configuration Examples

In the below, other configuration examples of the retainer 23 are described.

First Modified Embodiment

Figure 13:
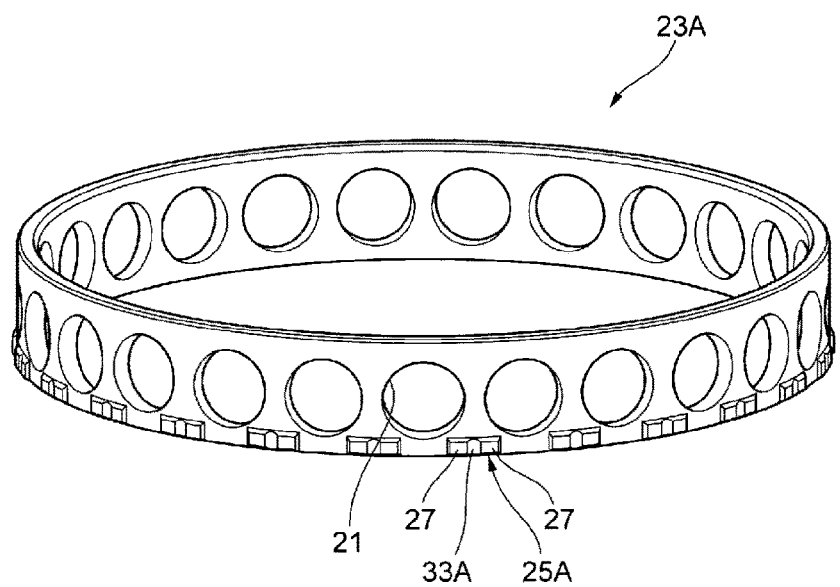
FIG. 13 is an outward perspective view of the retainer shown in FIG. 12.
Figure 14:
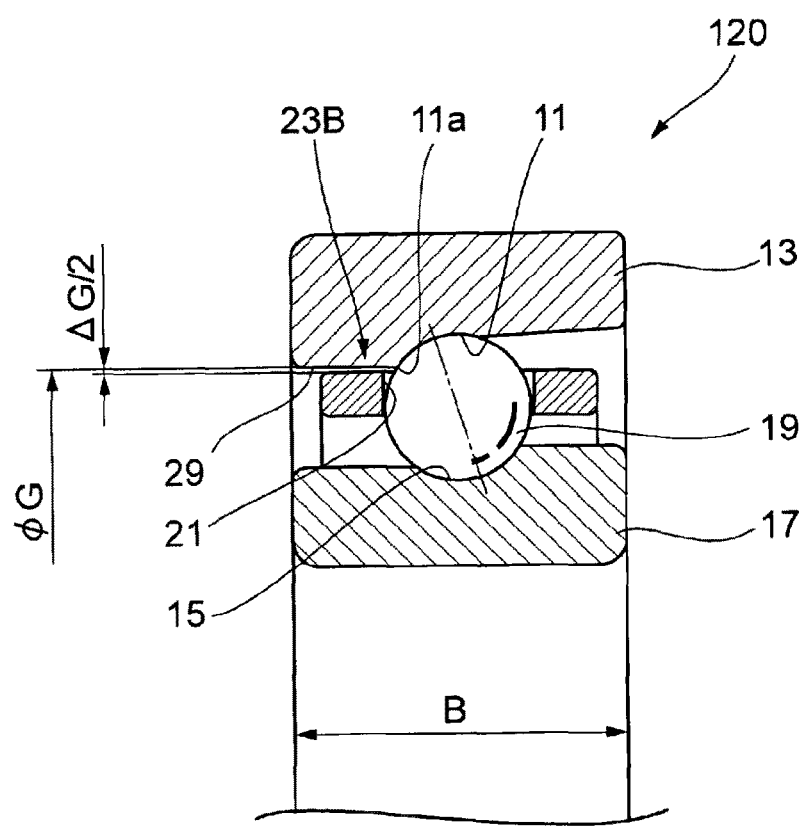
FIG. 14 is a partially sectional view of an angular ball bearing having a retainer of another configuration.

FIG. 13 is a partially sectional view of an angular ball bearing 110 having a retainer 23A of another configuration, and FIG. 14 is an outward perspective view of the retainer 23A. In below descriptions, the same members as the members of FIG. 1 are denoted with the same reference numerals and the descriptions thereof are omitted or simplified.

The retainer 23A of the first modified embodiment is provided with the guided portion 25A only at one axial end-side, and the guided portion of the other end-side is omitted. The guided portion 25A of the retainer 23A is guided by the outer ring inner peripheral surface 29 of the outer ring 13. At this time, the retainer 23A is provided with the edge relief part 37, so that the raceway surface edge 11a of the outer ring is not contacted to the retainer 23A. Also, the parting line (not shown) upon the injection molding of the retainer 23A is provided in the groove portion 33A formed in the guided portion 25A along the axial direction, like the above-described configuration.

According to the first modified embodiment, it is possible to further simplify the structure of the retainer 23A and the parting line becoming the convex portion (burr) is arranged in the groove portion 33A, so that the bearing is not influenced by the burr. Therefore, it is possible to improve both the durability and productivity of the retainer 23A.

Also, the inner peripheral surface of the pocket 21 of the retainer 23A has the predetermined surface properties. The surface shape is formed by transferring the processing surface of the die (the slide core 43).

According to the first modified embodiment, it is possible to further simplify the structure of the retainer 23A. Also, the grease (lubricant) is kept in the micro concave portions of the pocket 21 forming the predetermined surface roughness, so that the grease is supplied from the concave portions to the contact interface between the inner peripheral surface of the pocket 21 and the rolling element 19. Therefore, it is possible to improve the durability of the retainer 23A.

In the meantime, the surface properties of the guide surface 27 and chamfered portion 31 of the retainer 23A and the inner peripheral surface of the pocket 21 may be formed at least at one thereof or may be formed at both thereof.

When the surface properties are formed at both thereof, it is possible to further improve the wear resistance and durability of the retainer 23A by the synergetic effect.

Second Modified Embodiment

Figure 15:
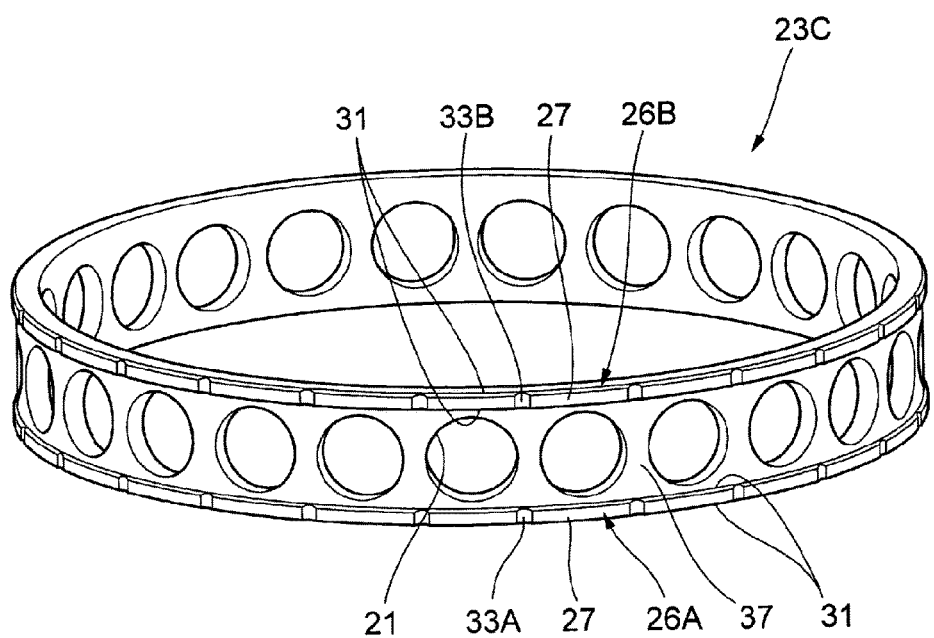
FIG. 15 is an outward perspective view of a retainer having another configuration.

FIG. 15 is a partially sectional view of an angular ball bearing 120 having a retainer 23B of another configuration. The retainer 23B of the second modified embodiment is not provided with both the guided portions 25A, 25B, and the inner peripheral surface of the pocket 21 of the retainer 23B is formed with the predetermined surface properties by the transfer from the die. The others are the same as the retainer 23A of the first modified embodiment.

According to the second modified embodiment, it is possible to further simplify the structure of the retainer 23B. Also, the grease (lubricant) is kept in the micro concave portions of the pocket 21 forming the predetermined surface roughness, so that the grease is supplied from the concave portions to the contact interface between the inner peripheral surface of the pocket 21 and the ball 19. Therefore, it is possible to improve the durability of the retainer 23B.

Third Modified Embodiment

Figure 16:
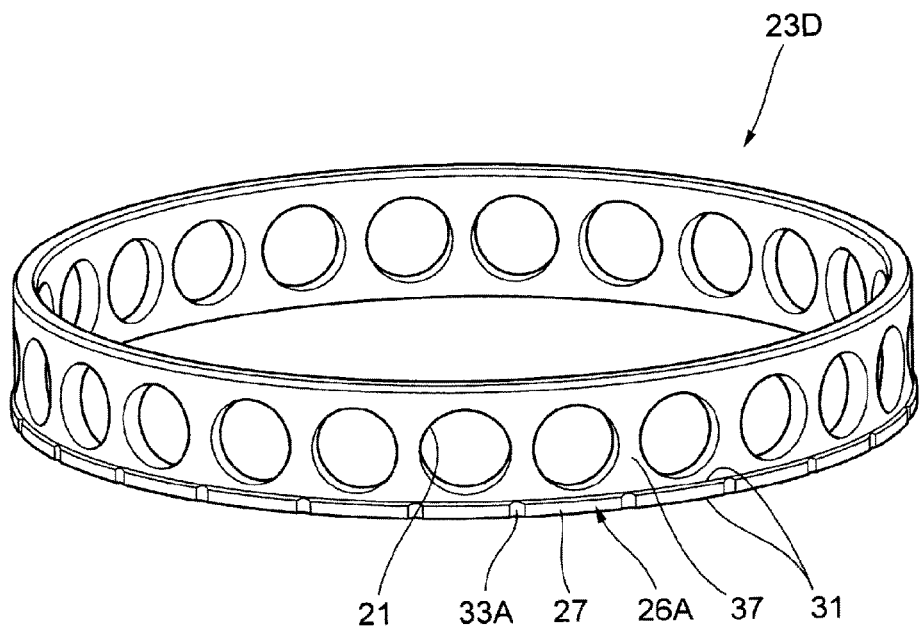
FIG. 16 is an outward perspective view of a retainer having another configuration.

FIG. 16 is an outward perspective view of a retainer 23C of another configuration. The retainer 23C is provided with guided portions 26A, 26B protruding radially outwards from both axial ends of the outer diameter surface of the retainer. Each of the guided portions 26A, 26B is formed with a plurality of groove portions 33A, 33B, each of which is recessed from the radial height of the guide surface 27, along the axial direction.

In the retainer 23C of the third modified embodiment, one set of the groove portions 33A, 33B is arranged at the same circumferential position, like the retainer 23 of FIG. 3. Also, axial edge portions of the guided portions 26A, 26B of the guide surface 27 are formed with the chamfered portions 31, 31. However, the outer diameter grooves 35A, 35B (refer to FIG. 3) are not provided, and the guide surface 27 is continuously arranged in the circumferential direction.

Also, the parting lines (not shown) are provided in the groove portions 33A, 33B formed in the guided portions 26A, 26B along the axial direction, like the above-described configuration.

According to the retainer 23C of the third modified embodiment, the surrounding edge of the guide surface 27 becomes the chamfered portion 31, so that the wear is difficult to progress. Also, the raceway surface edge 11a (refer to FIG. 1) is not contacted to the retainer 23 due to the edge relief part 37 recessed radially inwards, so that it is possible to prevent the wear resulting from the contact before happens. Further, the guide surface 27 and the chamfered portion 31 become the shape-transferred surfaces having the predetermined surface roughness, so that it is possible to improve the wear resistance. Also, the parting lines becoming the convex portions (burrs) are arranged in the groove portions 33A, 33B, so that the bearing is not influenced by the burrs. Therefore, it is possible to improve both the durability and productivity of the retainer 23B.

Also, the retainer 23C has the pockets 21 to which the surface shape having the predetermined surface roughness has been transferred from the slide cores 43.

According to the retainer 23C of the third modified embodiment, the inner peripheral surface of the pocket 21 becomes the shape-transferred surface having the predetermined surface properties, so that it is possible to improve the wear resistance and to increase the durability of the retainer 23C.

In the meantime, the surface properties of the guide surface 27 and chamfered portion 31 of the retainer 23C and the inner peripheral surface of the pocket 21 may be formed at least at one thereof or may be formed at both thereof. When the surface properties are formed at both thereof, it is possible to further improve the wear resistance and durability of the retainer 23C by the synergetic effect.

Fourth Modified Embodiment

Figure 17:
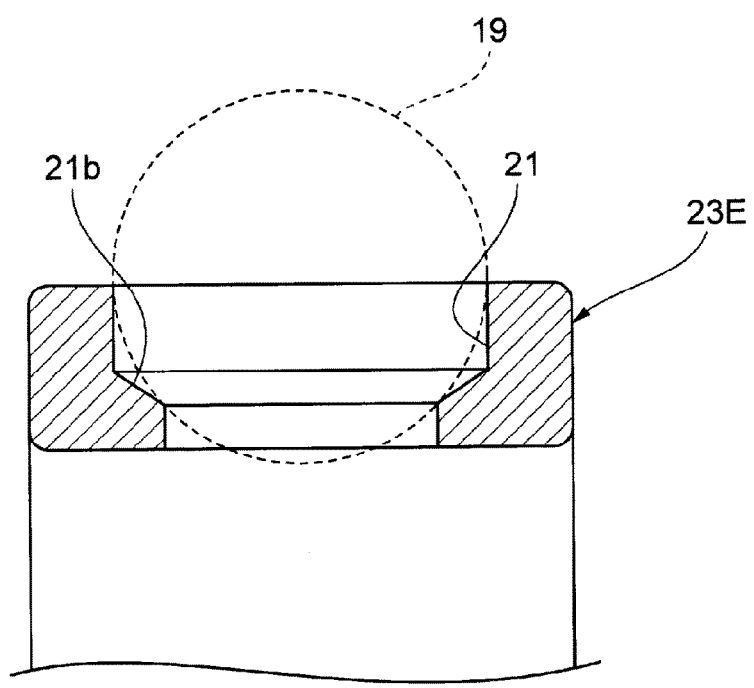
FIG. 17 is a partially enlarged sectional view of a retainer of a rolling element guide type.

FIG. 17 is an outward perspective view of a retainer 23D of another configuration. The retainer 23D is the same as the retainer 23C of the third modified embodiment, except that the guided portion 26A protruding radially outwards is provided only at one axial end of the outer diameter part of the retainer.

According to the retainer 23D of the fourth modified embodiment, it is possible to simplify the structure of the retainer 23D, and the parting line becoming the convex portion (burr) is arranged in the groove portion 33A, so that the bearing is not influenced by the burr. Therefore, it is possible to improve both the durability and productivity of the retainer 23D.

Also, according to the retainer 23D of the fourth modified embodiment, it is possible to simplify the structure of the retainer 23D and the inner peripheral surface of the pocket 21 is formed with the surface shape having the predetermined surface properties by the transfer from the die, so that the grease is supplied to the contact interface between the inner peripheral surface of the pocket 21 and the rolling element 19. Therefore, it is possible to improve the durability of the retainer 23D.

In the meantime, the surface properties of the guide surface 27 and chamfered portion 31 of the retainer 23D and the inner peripheral surface of the pocket 21 may be formed at least at one thereof or may be formed at both thereof. When the surface properties are formed at both thereof, it is possible to further improve the wear resistance and durability of the retainer 23D by the synergetic effect.

In the meantime, the rolling bearing of the above configurations is not limited to the angular ball bearing and may be a rolling bearing of another type such as a cylindrical roller bearing, or a rolling bearing of a rolling element guide type. For example, as shown in FIG. 18, a rolling bearing of a rolling element guide type where a retainer 23E is guided by the balls 19 arranged to be freely rollable in taper holes 21b formed in the pockets 21 or by a roller is also possible.

Like this, the present invention is not limited to the embodiments, and combinations of the respective configurations of the embodiments and changes and modifications made by one skilled in the art on the basis of the specification and the well-known technology are also included within the scope of the present invention to be protected.

The subject application is based on a Japanese Patent Application No. 2015-020736 filed on Feb. 4, 2015, a Japanese Patent Application No. 2015-020737 filed on Feb. 4, 2015, a Japanese Patent Application No. 2016-017836 filed on Feb. 2, 2016 and a Japanese Patent Application No. 2016-017837 filed on Feb. 2, 2016, which are herein incorporated by reference.

DESCRIPTION OF REFERENCE NUMERALS

11: outer ring raceway surface
13: outer ring
15: inner ring raceway surface
17: inner ring
19: ball (rolling element)
21: pocket
21a: tapered surface
22: stepped portion
23, 23A, 23B, 23C, 23D, 23E: retainer (rolling bearing retainer)
25A, 25B: guided portion
26A, 26B: guided portion
27: guide surface
31: chamfered portion
33A, 33B: groove portion
37: edge relief part
41: outer die
43: slide core
100, 110, 120: angular ball bearing (rolling bearing)
D: radial length of inner peripheral surface (radial thickness of cylindrical surface)

The invention claimed is:
1. A synthetic resin rolling bearing retainer to be arranged between an inner ring and an outer ring of a rolling bearing,
wherein a plurality of guided portions protruding radially outward from an outer diameter surface of the retainer is provided along a circumferential direction of the outer diameter surface,
wherein each of the guided portions has a guide surface protruding to be in sliding contact with the outer ring, a chamfered portion formed at an edge portion of the guide surface, and a groove portion formed at a portion of the guide surface in an axial direction,
wherein the guide surface and the chamfered portion have surface properties where an arithmetic average roughness Ra is 1.0 to 9.8 µm and a maximum height Rt is 10.1 to 102.9 µm,
wherein a parting line is provided radially inside the guide surface, and
wherein the chamfered portion is provided over and entire circumference of a surrounding edge extending in an axial direction and a circumferential direction of the guide surface.

2. The rolling bearing retainer according to claim 1,
wherein the parting line is provided for any one of the groove portion and an end face of the bearing retainer.

3. The rolling bearing retainer according to claim 1,
wherein the chamfered portion has a curved surface that is connected to the edge portion of the guide surface in a tangential direction.

4. The rolling bearing retainer according to claim 1,
wherein the chamfered portion has an inclined surface, which is connected to the edge portion of the guide surface and of which an angle to the guide surface is 20° or less.

5. The rolling bearing retainer according to claim 1,
wherein a relief groove concaved radially inward is formed in a region facing a raceway surface edge that is a boundary between an outer ring inner peripheral surface and an outer ring raceway surface of the outer ring.

6. The rolling bearing retainer according to claim 1,
wherein a surface layer of the retainer is formed with an amorphous layer that has a thickness of 0.1 to 30 µm from a surface of the retainer and does not include therein a reinforced fiber.

7. A rolling bearing having the rolling bearing retainer according to claim 1.

8. A method for manufacturing the rolling bearing retainer of according to claim 1 by using a molding die, the method including:
transferring a shape of a processing surface applied to a die surface of the molding die to at least one of the guide surface and the chamfered portion.

\* \* \* \* \*